(12) United States Patent
Yang et al.

(10) Patent No.: US 10,402,915 B2
(45) Date of Patent: Sep. 3, 2019

(54) METHODS AND SYSTEMS FOR ON-DEVICE SOCIAL GROUPING

(71) Applicant: Samsung Electronics Co., Ltd., Suwon-si, Gyeonggi-do (KR)

(72) Inventors: Jun Yang, Milpitas, CA (US); Zhixian Yan, San Jose, CA (US); Lu Luo, Sunnyvale, CA (US); Xuan Bao, San Jose, CA (US); Haipeng Zhang, Bloomington, IN (US); Emmanuel Munguia Tapia, Newark, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 438 days.

(21) Appl. No.: 14/274,604

(22) Filed: May 9, 2014

(65) Prior Publication Data

US 2014/0337340 A1 Nov. 13, 2014

Related U.S. Application Data

(60) Provisional application No. 61/822,272, filed on May 10, 2013, provisional application No. 61/861,311, filed on Aug. 1, 2013.

(51) Int. Cl.
*G06Q 30/02* (2012.01)
*G06Q 50/00* (2012.01)

(52) U.S. Cl.
CPC ......... *G06Q 50/01* (2013.01); *G06Q 30/0204* (2013.01)

(58) Field of Classification Search
CPC ........ G06F 17/30705; G06F 17/30598; G06Q 50/01; G06Q 30/0204
USPC ......................................................... 707/737
See application file for complete search history.

(56) References Cited

U.S. PATENT DOCUMENTS

| | | | |
|---|---|---|---|
| 7,702,728 B2 | 4/2010 | Zaner et al. | |
| 8,019,692 B2 | 9/2011 | Rosen | |
| 8,135,777 B2 | 3/2012 | Colligan et al. | |
| 8,886,243 B1 * | 11/2014 | Pabla | H04L 67/24 455/518 |
| 2002/0115453 A1 | 8/2002 | Poulin et al. | |
| 2007/0168863 A1 * | 7/2007 | Blattner | G06F 3/011 715/706 |
| 2009/0313299 A1 * | 12/2009 | Bonev | G06Q 30/02 707/999.103 |
| 2010/0036912 A1 * | 2/2010 | Rao | H04L 51/20 709/204 |
| 2010/0076968 A1 | 3/2010 | Boyns et al. | |

(Continued)

OTHER PUBLICATIONS

Baden, Randy et al., "Persona: An Online Social Network with User-Defined Privacy," ACM SIGCOMM Computer Communication Review, vol. 39, No. 4, pp. 135-146, Aug. 2009.

(Continued)

*Primary Examiner* — Jorge A Casanova

(57) ABSTRACT

Methods, systems, and computer readable media for social grouping are provided to perform social grouping of a user's contacts based on the user's interactions with the contacts. A set of attributes associated with interactions between a user and a set of contacts may be determined by a first device. The set of attributes associated with the interactions may be related to the first device. The set of contacts may be organized into a set of groups based on the set of attributes.

11 Claims, 10 Drawing Sheets

(56) References Cited

U.S. PATENT DOCUMENTS

| | | | |
|---|---|---|---|
| 2010/0325207 A1* | 12/2010 | Churchill | H04L 51/14 709/204 |
| 2011/0276689 A1 | 11/2011 | Rosen | |
| 2011/0319061 A1* | 12/2011 | Schmackpfeffer | H04L 12/587 455/415 |
| 2011/0320536 A1* | 12/2011 | Lobb | G06Q 50/01 709/205 |
| 2012/0197986 A1 | 8/2012 | Chen et al. | |
| 2012/0221441 A1 | 8/2012 | Patterson et al. | |
| 2012/0324042 A1 | 12/2012 | Graham et al. | |
| 2013/0122934 A1 | 5/2013 | Branch et al. | |
| 2013/0132865 A1 | 5/2013 | Li | |
| 2013/0212606 A1* | 8/2013 | Kannan | G06Q 50/01 725/12 |
| 2013/0232324 A1 | 9/2013 | Rubin et al. | |
| 2014/0025973 A1 | 1/2014 | Schillings et al. | |
| 2014/0032259 A1 | 1/2014 | LaFever et al. | |

OTHER PUBLICATIONS

Barabasi, Albert-Laszlo et al., "Evolution of the Social Network of Scientific Collaborations," Physica A: Statistical Mechanics and its Applications, vol. 311, No. 3, pp. 590-614, Aug. 2002.

Cho, Eunjoon et al., "Friendship and Mobility: User Movement in Location-Based Social Networks," Proceedings of the 17th ACM SIGKDD International Conference on Knowledge Discovery and Data Mining, pp. 1082-1090, Aug. 2011.

Cooley, Charles Horton, "Human Nature and the Social Order," Charles Scribner's Sons, New York, pp. 1-44, 1902.

Cooley, Charles Horton, "Social Organization: A Study of the Larger Mind," Charles Scribner's Sons, New York, pp. 23-31, 1909.

Culotta, Aron et al., "Extracting Social Networks and Contact Information from Email and the Web," Proceedings of the First Conference on Email and Anti-Spam (CEAS), Jul. 2004.

Do, Trinh Minh Tri et al., "GroupUs: Smartphone Proximity Data and Human Interaction Type Mining," Proceedings of the 15th IEEE International Symposium on Wearable Computers (ISWC 2011), pp. 21-28, Jun. 2011.

Eagle, Nathan et al., "Reality Mining: Sensing Complex Social Systems," Personal and Ubiquitous Computing, vol. 10, No. 4, pp. 255-268, 2006.

Ebel, Holger et al., "Dynamics of Social Networks," Complexity, vol. 8, No. 2, pp. 24-27, 2002.

Elance, Inc., "Hire Freelancers and Find Freelance Jobs Instantly | Elance," May 8, 2013 [webpage retrieved Mar. 13, 2015 from the Internet Archive at https://web.archive.org/web/20130508140730/https://www.elance.com].

Fortunato, Santo, "Community Detection in Graphs," Physics Reports, vol. 486, No. 3, pp. 75-174, Jan. 25, 2010.

Gilbert, Eric et al., "Predicting Tie Strength With Social Media," Proceedings of the SIGCHI Conference on Human Factors in Computing Systems (CHI '09), pp. 211-220, Apr. 2009.

Gong, Neil Zhenqiang et al., "Evolution of Social-Attribute Networks: Measurements, Modeling, and Implications Using Google+," Proceedings of the 12th ACM SIGCOMM Conference on Internet Measurement (IMC '12), pp. 131-144, Nov. 2012.

Google, Inc., "Contacts Plus," Mar. 21, 2013 [webpage retrieved Mar. 13, 2015 from the Internet Archive at https://web.archive.org/web/20130330075607/https://play.google.com/store/apps/details?id=com.contapps.android&hl=en].

Google, Inc., "Funf-Open-Sensing-Framework—Android-Based Framework for Phone-Based Sensing and Data-Collection," Dec. 5, 2012 [webpage retrieved Mar. 13, 2015 from the Internet Archive at https://web.archive.org/web/20121205031704/http://code.google.com/p/funf-open-sensing-framework/].

Google, Inc., "GangBook—Group Contact Manager," Feb. 28, 2011 [webpage retrieved Mar. 13, 2015 from the Internet Archive at https://web.archive.org/web/20130925013355/https://play.google.com/store/apps/details?id=com.guardroid.m.gb&hl=en].

Google, Inc., "GO Contacts," Jul. 14, 2011 [webpage retrieved Mar. 13, 2015 from the Internet Archive at https://web.archive.org/web/20120803170030/https://play.google.com/store/apps/details?id=com.jbapps.contact&hl=en].

Google, Inc., "Groupy / Contact by Group," Jun. 11, 2012 [webpage retrieved Mar. 13, 2015 from the Internet Archive at https://web.archive.org/web/20140928153934/https://play.google.com/store/apps/details?id=com.kigate.groupy&hl=en].

Granovetter, Mark, "The Strength of Weak Ties: A Network Theory Revisited," Sociological Theory, vol. 1, pp. 201-233, 1983.

Huang, Zhixing et al., "Exploring Emergent Semantic Communities from DBLP Bibliographic Database," International Conference on Advances in Social Network Analysis and Mining (ASONAM '09), pp. 219-224, Jul. 2009.

Li, Kevin A. et al., "Exploring Social Interactions and Attributes of Casual Multiplayer Mobile Gaming," Proceedings of the 4th International Conference on Mobile Technology, Applications, and Systems and the 1st International Symposium on Computer Human Interaction in Mobile Technology (Mobility '07), pp. 696-703, Sep. 2007.

Maclean, Diana et al., "Groups Without Tears: Mining Social Topologies from Email," Proceedings of the 16th International Conference on Intelligent User Interfaces, pp. 83-92, Feb. 2011.

Massachusetts Institute of Technology Human Dynamics Lab, "Reality Commons: Friends and Family Dataset," Nov. 23, 2012 [webpage retrieved Mar. 13, 2015 from the Internet Archive at https://web.archive.org/web/20121123072127/http://realitycommons.media.mit.edu/friendsdataset.html].

Palla, Gergely et al., "Quantifying Social Group Evolution," Nature, vol. 446, No. 7136, pp. 664-667, Apr. 5, 2007.

Raento, Mika et al., "Smartphones: An Emerging Tool for Social Scientists," Sociological Methods Research, vol. 37, No. 3, pp. 426-454, Feb. 2009.

Salvador, Stan et al., "Determining the Number Of Clusters/Segments in Hierarchical Clustering/Segmentation Algorithms," 16th IEEE International Conference on Tools with Artificial Intelligence (ICTAI 2004), pp. 576-584, Nov. 2004.

Seshadri, Mukund et al., "Mobile Call Graphs: Beyond Power-Law and Lognormal Distributions," Proceedings of 14th ACM SIGKDD International Conference on Knowledge Discovery and Data Mining (KDD '08), pp. 596-604, Aug. 2008.

Sun, Deyi et al., "Social Relationship Classification Based on Interaction Data from Smartphones," 2nd International IEEE Workshop on Hot Topics in Pervasive Computing, pp. 205-210, Mar. 18, 2013.

Wang, Xufei et al., "Discovering Overlapping Groups in Social Media," Proceedings of the 10th IEEE International Conference on Data Mining (ICDM '10), pp. 569-578, Dec. 2010.

Zheng, Jiangchuan et al., "An Unsupervised Learning Approach to Social Circles Detection in Ego Bluetooth Proximity Network," Proceedings of the 2013 ACM International Joint Conference on Pervasive and Ubiquitous Computing (UbiComp '13), pp. 721-724, Sep. 2013.

* cited by examiner

|  |  |  | | 501 Call | 502 SMS | 503 Bluetooth |
|---|---|---|---|---|---|---|
| Time Specific Frequency 510 | Weekday 514 | Morning* | 516 | o | o | o |
| | | Afternoon* | 517 | o | o | o |
| | | Evening* | 518 | o | o | o |
| | | Night* | 519 | o | o | o |
| | Weekend 515 | Morning* | 520 | o | o | o |
| | | Afternoon* | 521 | o | o | o |
| | | Evening* | 522 | o | o | o |
| | | Night* | 523 | o | o | o |
| Type Specific Frequency 511 | Incoming + Missed | | 524 | o | o | x |
| | Outgoing | | 525 | o | o | x |
| Location Specific Frequency 512 | Home | 526 | | o | o | o |
| | Work | 527 | | o | o | o |
| | Elsewhere | 528 | | o | o | o |
| Average Duration 513 | | | | o | x | o |

METHODS AND SYSTEMS FOR ON-DEVICE SOCIAL GROUPING

CROSS-REFERENCE TO RELATED APPLICATIONS

The present application claims priority to U.S. Provisional Patent Application Ser. No. 61/822,272, filed May 10, 2013, entitled "SmartGroup: Social Grouping via Multimodal Mobile Phone Interactions," and U.S. Provisional Patent Application Ser. No. 61/861,311, filed Aug. 1, 2013, entitled "SmartCircle: On-device Social Grouping via Multimodal Mobile Interaction Analysis," which are incorporated herein by reference in their entireties.

FIELD OF THE INVENTION

The present technology relates to the field of social grouping. More particularly, the present technology discloses user-centric social grouping.

BACKGROUND

Grouping of social connections to form social networks have become useful in many contexts. Better understanding of a user's social connections can provide better insight into the user. Such insight can facilitate the placement of the user into optimal social networks so that the user can enjoy association with similar social connections. Such insight can also provide a competitive edge for existing and emerging businesses that depend on their ability to tailor goods and services to the particular needs of the user. As a result, it is important to understand the social connections among individuals, both in the real world and in cyberspace.

Conventional approaches in the grouping of social connections are associated with certain limitations. Some conventional techniques take a global view of social connections among a user's contacts, which can cause low grouping accuracy. In this regard, a connection between a user and his or her particular contacts of the user may be overshadowed by the relationship between the user and all of his or her contacts in the entire social network. In addition, other conventional techniques may raise privacy concerns as a user's social connections are identified by analyzing data stored in a system controlled by others. User data uploaded to such a system exposes personal information of the user to a higher risk of privacy violations and data breach.

SUMMARY

Various embodiments of the present disclosure can include systems, methods, and non-transitory computer readable media configured to perform social grouping of a user's contacts based on the user's interactions with the contacts. A set of attributes associated with interactions between a user and a set of contacts may be determined by a first device. The set of attributes associated with the interactions may be related to the first device. The set of contacts may be organized into a set of groups based on the set of attributes.

In one embodiment, the set of attributes comprises spatial-temporal information including at least one of frequency or duration.

In one embodiment, the set of attributes are associated with a set of communication modalities comprising at least one of voice calling, video calling, text messaging, or a Bluetooth connection.

In one embodiment, records related to the interactions may be obtained.

In one embodiment, subsequent to obtaining records related to the interactions, interaction data of the user with his or her contacts may be generated by processing the records.

In one embodiment, the set of attributes are determined based on the interactions.

In one embodiment, a feature vector is constructed for a contact of the set of contacts. The feature vector represents the set of attributes associated with the interactions between the user and the contact.

In one embodiment, a group characteristic for each group of the set of groups is determined.

In one embodiment, group dynamics for the set of groups may be detected, and the set of contacts may be organized based on the group dynamics.

In one embodiment, the set of attributes is further associated with interactions recorded on a second device between the user and the set of contacts.

Many other features and embodiments of the invention will be apparent from the accompanying drawings and from the following detailed description.

BRIEF DESCRIPTION OF THE DRAWINGS

FIG. 5A is a table illustrating example features of various communication modalities according to an embodiment of the present disclosure.

Figure 1:
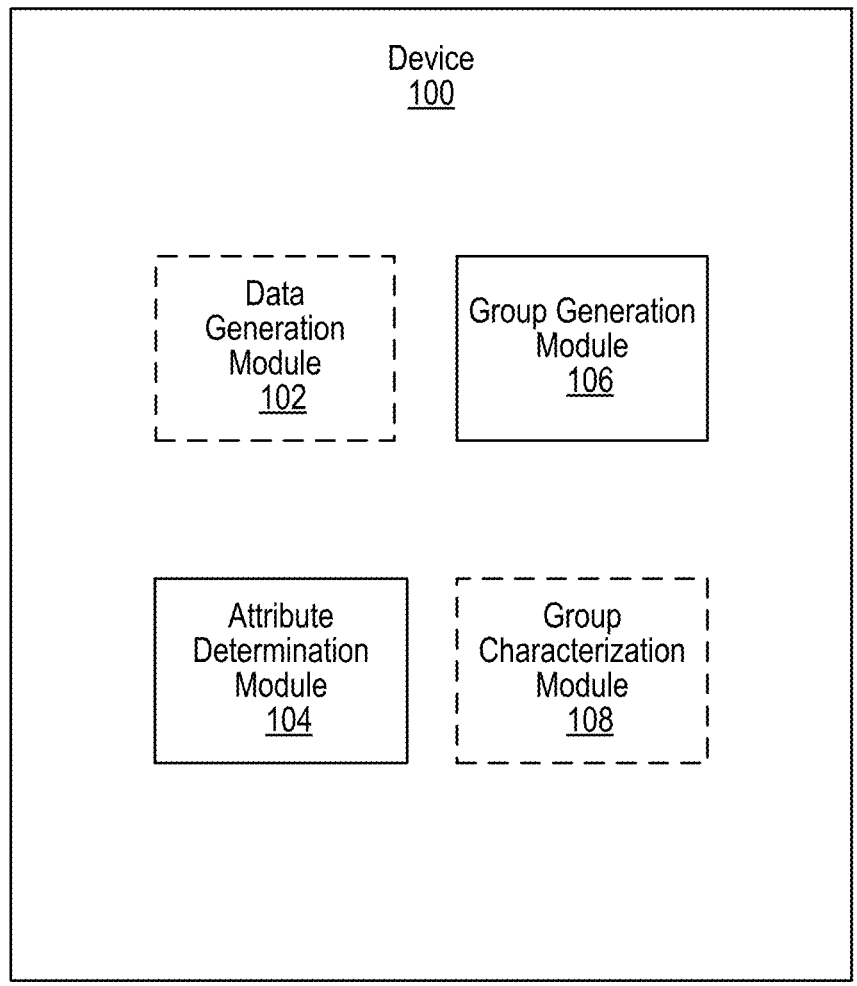
FIG. 1 illustrates an example device configured to organize a user's contacts in a user-centric manner according to an embodiment of the present disclosure.

The figures depict various embodiments of the present invention for purposes of illustration only, wherein the figures use like reference numerals to identify like elements. One skilled in the art will readily recognize from the following discussion that alternative embodiments of the structures and methods illustrated in the figures may be employed without departing from the principles of the invention described herein.

DETAILED DESCRIPTION

A user's contacts or social connections may be organized based on usage of mobile devices by users. A user's contacts or social connections, as described herein, may include individuals that the user interacts with in the real world or in the cyberspace via one or more communication modalities. Communication modalities may include, for example, calls (e.g., voice calls, video calls), text messaging (e.g., Short Message Service (SMS), Instant Messenger (IM) service, etc.), physical encounters, or applications (e.g., emails, social networks, games, web browsers, etc.)

A user may interact with contacts from different social groups differently. For example, professionals may make phone calls with business connections during work hours. As another example, friends and families may communicate during non-business hours. As yet another example, acquaintances may exchange emails on intermittent occasions. Various types of interactions between a user and a user's contact may reflect certain traits about the user's contacts. Accordingly, information describing interactions between a user and a user's contacts may be analyzed to organize the user's contacts. Various embodiments of the present disclosure organize a user's contacts or social connections by analyzing interaction data reflecting the user's interactions with his or her contacts or social connections on a mobile device or many mobile devices of the user. Interaction data may include, for example, information associated with phone calls, SMS communications, Bluetooth proximity, GPS co-locations, emails, and social network activities.

Interaction data associated with interactions between a user and the user's contacts may be obtained from various records. Social activities may leave footprints on the mobile device in various forms, such as call logs, SMS histories, emails, web browsing histories, and social network activities using mobile apps (e.g., Facebook®, Twitter®, etc.). In addition, physical sensors may also collect information regarding a user's social activities, such as physical encounters. For example, Bluetooth or NFC on mobile devices may be used to collect information on the physical proximity between a user and the user's contacts, and GPS or Wi-Fi may be used to detect a user's location and co-location with others. The organization of a user's contacts may be based on such records collected from one or more mobile devices of the user.

One or more attributes associated with interactions between a user and his or her contacts may be determined. In some embodiments, the attributes may include, for example, frequencies of interactions, durations of interactions between a user and the user's contacts across different communication modalities, and other information as described in more detail herein. Attributes of the interaction data may be represented by feature vectors with various dimensions. Various embodiments of the present disclosure extract features from interaction data to capture spatial-temporal relationships of the interaction data. The feature vectors may be projected in an n-dimensional space to facilitate the organization of contacts and the identification of an optimal number of groups.

Contacts may be organized into groups based on the attributes associated with interactions between a user and the user's contacts. Each group may comprise one or more of a user's contacts. Various embodiments of the present disclosure may perform multimodal clustering to partition a user's interactions with different contacts and thereby organize the contacts. The multimodal clustering may include various techniques, which are described in more detail herein. The clustering technique may be hierarchical and may be related to attribute determination. Subsequent to organizing a user's contacts into groups, each group may be associated with certain characteristics unique to the group.

FIG. 1 illustrates an example device 100 configured to organize a user's contacts in a user-centric manner according to an embodiment of the present disclosure. The device 100 may be mobile or non-mobile. The device 100 may be, for example, a smartphone (e.g., GALAXY NOTE®), a game counsel (XBOX®), a computer (e.g., a personal computer), a tablet (e.g., GALAXY TAB®), and/or a wearable device (e.g., a smartwatch (e.g., GALAXY GEAR™), an activity tracker (e.g., GALAXY GEAR™ FIT). As shown in FIG. 1, the example device 100 may comprise an attribute determination module 104 and a group generation module 106. The example device 100 may further optionally comprise a data generation module 102 or a group characterization module 108.

A user may interact with the user's contacts by using the device 100. The user's contacts may include individuals that the user interacts via different communication modalities. The user may interact with a contact via, for example, calls (e.g., voice calls, video calls), text messaging (e.g., Short Message Service (SMS), Instant Messenger (IM) service, etc.), physical encounters (e.g., Bluetooth connection, Wi-Fi connection, NFC connection, GPS, etc.), or applications (e.g. email, social networks, games, web browser, etc.). The user may communicate with his or her contacts by voice calling, video calling, text messaging, connecting by Bluetooth, emailing, playing a game, or using a social network (e.g., checking a contact's status updates, chatting in a social network, shaking phones together at the same time, etc.)

The data generation module 102 may be configured to generate interaction data. The interaction data is related to interactions between a user and the user's contacts. The data generation module 102 may collect and parse communication records related to different communication modalities. The interaction data may include various types of information, such as a time point when a call starts, a time point when a call ends, a time point when a user sends a message, a time point when a user receives a message, a phone number of a contact, a chat ID of a contact, etc. The data generation module 102 may generate the interaction data based on a unique contact ID associated with a contact. A contact can be represented by multiple IDs across different communication modalities, which may cause difficulties or errors in organizing contacts. To address these difficulties, the data generation module 102 may generate interaction data such that a contact corresponds to the unique contact ID and may arrange the interaction data of a user with a contact based on the contact ID.

The attribute determination module 104 may be configured to determine one or more attributes associated with interactions between a user and his or her contacts. The interactions between the user and the contacts are based on use of the device 100 by the user. The attribute determination module 104 may be configured to capture the spatial-temporal relationships of the interactions. In some embodiments, the attributes may include, for example, frequencies of interactions and durations of interactions, between a user and the user's contacts, across different communication modalities. In some embodiments, the attributes may include, for example, a user's location when interacting with the user's contact. Attributes may further include, for example, a user's tone, pitch, or volume when interacting with the user's contact, metadata of interactions, burst frequencies of interactions, or durations of the burst.

The group generation module 106 may be configured to organize a user's contacts into groups based on the attributes. To organize a user's contacts, the group generation module 106 may perform multimodal clustering. Multimodal clustering, as used herein, may involve spatial and temporal clustering, feature-level fusion, or optimal-K clustering. Other suitable techniques also may be used. The multimodal clustering may be performed based on the attributes determined by the attribute determination module 104. The group generation module 106 may be configured to determine the optimal partitioning of the contacts into the optimal number of groups. In some embodiments, the group generation module 106 may be configured to dynamically identify a significant partition of the attributes (e.g., significant locations, significant time windows, etc.) determined by the attribute determination module 104. The significant partition of the attributes reveals a user's behavior pattern, which may be used as a feature to organize contacts. In various embodiments, a significant location or a significant time may be identified by spatial clustering or temporal clustering, respectively.

The group characterization module 108 is configured to characterize each contact group. A group of contacts may be associated with certain characteristics, such as a group size or a group significance ranking in terms of closeness. The group characterization module 108 may be configured to detect the ground truth of a user's social groups. The ground truth of a user's social groups may be determined based on a user's labeling of the user's contacts. The ground truth of a user's social groups may provide a basis for characterizing a group of contacts. Groups determined by the group characterization module 108 may be compared to the ground truth by using grouping metrics (e.g., purity metric). The group characterization module 108 may be further configured to monitor group evolution over time. Because a user's contacts and a user's interactions with a contact may change, initial organization of contacts may warrant updating to reflect changes in the original groups, the formation of any new group, or the termination of any original group.

Figure 2:
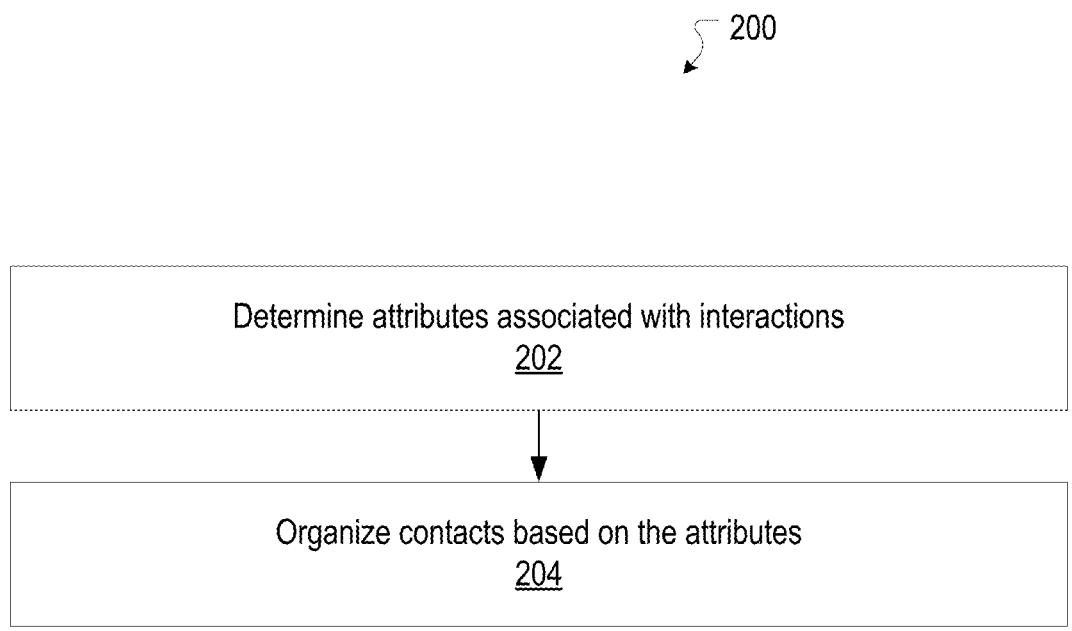
FIG. 2 illustrates an example flowchart of a method for organizing contacts in a user-centric manner according to an embodiment of the present disclosure.

FIG. 2 illustrates an example flowchart of a method 200 for organizing contacts in a user-centric manner according to an embodiment of the present disclosure. At block 202, attributes associated with interactions between a user and his or her contacts are determined. The interactions may be based on a device that the user uses to interact with the contacts. The interactions may also be based on multiple devices that the user uses to interact with the contacts. Based on the attributes, the interaction data associated with interactions between a user and his or her contacts may be projected into different spaces and reveal different patterns. In this regard, attributes of the interaction data may be represented by feature vectors with various dimensions. The feature vectors may be projected in an n-dimensional space to facilitate the organization of contacts and the identification of the optimal number of groups, as discussed in more detail herein.

At block 204, the contacts are organized into groups based on the attributes determined at block 202. Each group may comprise one or more of a user's contacts. In some embodiments, the contacts may be organized by performing multimodal clustering based on the attributes determined at block 204, thereby partitioning a user's interactions with different contacts. The multimodal clustering may include spatial and temporal clustering, feature-level fusion, and/or optimal-K clustering. The clustering technique may be hierarchical and may be related to attribute determination. For example, the spatial and temporal clustering may find a significant time window or a significant location in attribute determination. The spatial clustering may partition interactions into several groups according to geo-locations. For instance, for a teacher, signification locations may be partitioned to include the person's home, office, gym, and other locations. However, for a long-distance truck driver, significant locations may be partitioned to include frequently stayed places. The temporal clustering relates to the time domain and identifies partitions of interactions based on different time windows. For instance, for an engineer, significant time windows may be partitioned to include business hours on weekdays, off-business hours on weekdays, and weekends.

Other types of multimodal clustering techniques may also be used. The feature-level fusion constructs a global feature vector integrated with time and location, which reflects attributes of interactions between a user and a user's contacts based on various communication modalities. In various embodiments, the global feature vector may be based on single-modal feature vectors. Each single-modal feature vector represents features for a particular communication modality. The optimal-K clustering may be applied to organize the user's contacts into groups based on a determination of an optimal group number to organize the user's contacts.

Figure 3A:
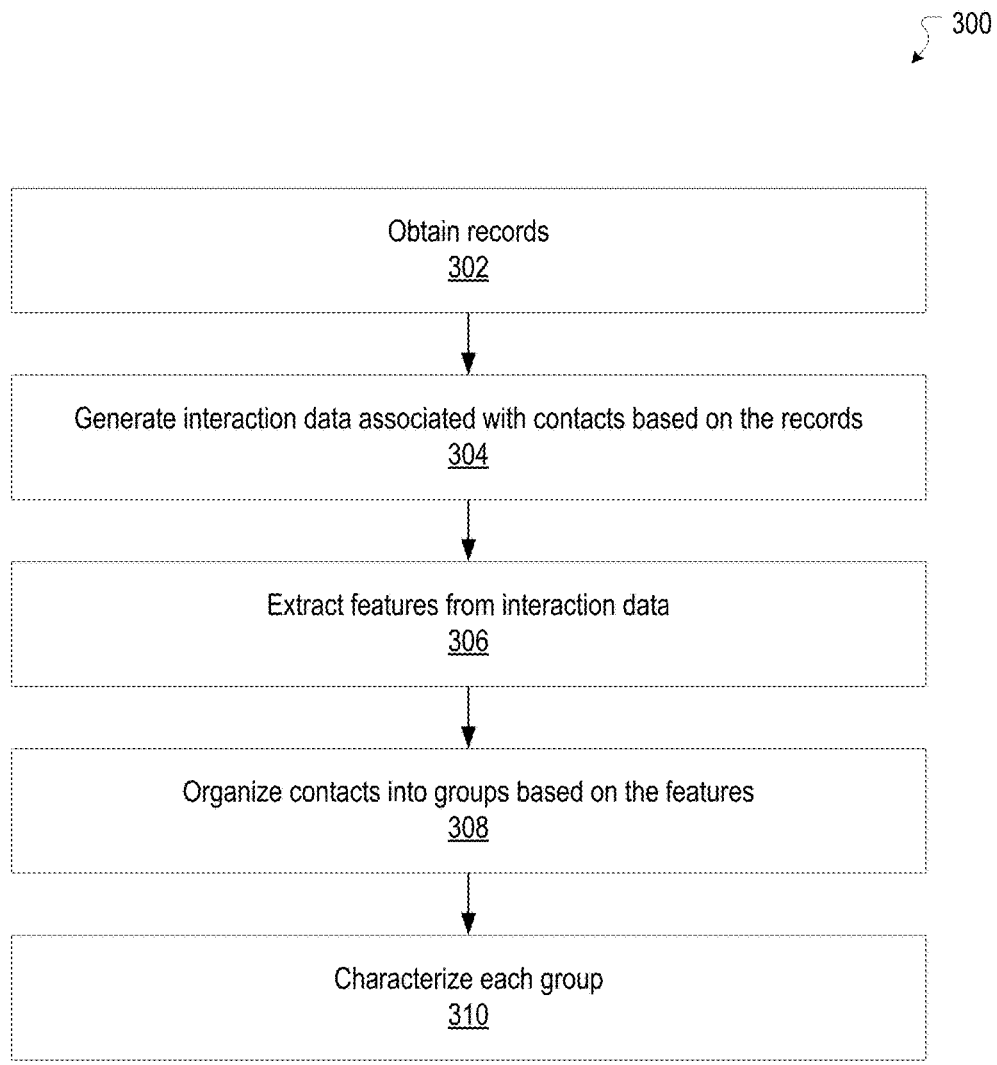
FIG. 3A illustrates an example flowchart of a method for organizing contacts in a user-centric manner according to an embodiment of the present disclosure.

FIG. 3A illustrates an example flowchart of a method 300 for organizing contacts in a user-centric manner according to an embodiment of the present disclosure. At block 302, records related to interactions between a user and the user's contacts are obtained. Interactions between a user and the user's contacts may be logged in various records, such as call logs, SMS logs, location traces, Bluetooth proximity logs, social network history, etc. In some embodiments, records may be obtained from one or more record sources. A user may use multiple devices to interact with the user's contacts. For instance, a user may interact with the user's contacts using a smart phone at work during the day and a tablet at home at night. Records may be obtained from both the smart phone and the tablet. Records from different record sources associated with different mobile devices may be processed and analyzed together to organize the contacts of the user.

At block 304, interaction data is determined based on the records obtained at block 302. In various embodiments, raw data in the records may be converted into interaction data, that is associated with the interactions between the user and the user's contacts. For example, raw data of call logs, SMS logs, Bluetooth logs, social network histories may be converted into interaction data. The interaction data may be sorted and stored according to the particular communication modality associated with particular interaction data. For example, the interaction data related to interactions based on calls may be stored in one data table and the interaction data related to interactions based on SMS may be stored in another data table.

Interaction data may be related to all interactions between a user and a contact. Interactions between the user and the contact may be recorded in various logs, and the contact may have different IDs in various records. For example, a contact may be represented by his or her name in a call log, by his or her device ID in a Bluetooth log, and by his or her screen name in a chat application. A contact ID may be created to represent a contact and stored in a reference table. The contact ID may be unique for each contact. The reference table may further map the contact ID of a contact with the other IDs associated with the contact in various records. Data in different records that correspond to the same contact may be linked by the contact ID. As such, interaction data related to interactions between a user and a contact may be created from all the raw data related to the contact in different records. Accordingly, interaction data may reflect all the interactions between a user and the contact and may be used to characterize interactions between a contact and the user.

Subsequently, at block 306, features may be extracted from the interaction data determined at block 304. In various embodiments, attributes associated with interactions (e.g., determined at block 202) comprise specific features that provide detailed or granular information about attributes. Features may be defined or selected such that the spatial-temporal relationships of interaction data may be captured and optimal partitions of a user's contacts may be determined. In some embodiments, features may reflect specific information relating to, for example, a frequency, a duration, a location, or a property of an interaction. Features may further reflect specific information relating to, for example, metadata, pitch, tone, or volume of a user's voice, physical proximity between a contact and a user, data burst, data size, application name, domain name, phone number, the number of communication modalities a user uses to interact with a contact, etc. Features may be represented as dimensions of information of a feature vector, as described in more detail herein.

Features may facilitate organization of contacts and may be extracted for all contacts of a user. Contacts with whom a user interacts similarly may be grouped together based on features. For example, a significant location or a significant time window may be identified as features and used to organize contacts. Contacts with whom a user interacts at a significant location or during a significant time window may need to be grouped together. For example, contacts with whom a user interacts at work or during business hours may be business connections.

Features may relate to frequencies of interactions. Frequencies for all interactions based on various communication modalities may be extracted. In various embodiments, frequencies of interactions may relate to calls (e.g., voice calls, video calls, etc.), SMS messages, physical encounters (e.g., Bluetooth, Wi-Fi, NFC, GPS, etc.), or applications (e.g., emails, social networks, games, web browser, etc.). In some embodiments, a location specific frequency may be extracted. The location specific frequency captures the spatial information in interactions between a user and the user's contacts at a location. Significant locations (e.g., home, work, frequently visited places such as coffee shops, grocery stores, schools, etc.) may be identified for a user. At each significant location, the frequency of interactions based on one or more communication modalities between the user and a contact may be determined. At a significant location, contacts with whom a user interacts may be grouped together. At a significant location, the more (or less) frequently a user interacts with a contact, the more (or less) likely the contact belongs to a group. For example, contacts that a user interacts with at the user's office may be grouped together. The more frequently a user interacts with a contact at the user's office, the more likely that contact should be grouped as the user's business connection.

In some embodiments, a feature of a time specific frequency is extracted. Significant time windows (e.g., regular business hours, non-business hours, weekdays, weekends, etc.) may be identified for a user. A significant time window may be predetermined, such as weekdays and weekends. The significant time windows may also be identified from the user's calendar. For example, a significant time window may be determined based on a recurrent meeting calendar entry on a user's calendar. In a significant time window, contacts with whom a user interacts may be grouped together. For example, contacts with whom a user interacts during business hours may be grouped together. In each significant time window, the frequency of interactions based on one or more communication modalities between the user and a contact may be determined. In a significant time window, the more (or less) frequently a user interacts with a contact, the more (or less) likely the contact belongs to a group. For example, the more frequently a user interacts with a contact during business hours, the more likely that contact should be grouped as the user's business connection.

In some embodiments, a feature of a property specific frequency is extracted. Properties such as incoming, outgoing, accepted, rejected, ignored, missed, may be determined. The property specific frequency may reveal information of the relationship between a contact and the user. For a property, contacts with whom a user interacts with may be grouped together. For instance, contacts whose interactions with the user are ignored may be grouped together. For each property, the frequency of interactions, based on one or more communication modalities, may be determined. For a property, the more (or less) frequently a user interacts with a contact, the more (or less) likely the contact belongs to a group. For example, the more frequently a user rejects calls from a contact, the more likely the contact should be grouped as a stranger.

Features may relate to durations of interactions. Durations for all interactions based on various communication modalities may be extracted. For example, durations of interactions may relate to calls (voice calls, or video calls), SMS messages, physical encounters (Bluetooth, Wi-Fi, NFC, GPS, etc.), or applications (e.g., emails, social networks, games, web browsers, etc.). In some embodiments, a location specific duration may be extracted. Significant locations (e.g., home, work, frequently visited places such as coffee shops, grocery stores, schools, etc.) may be identified for a user. Contacts with whom a user interacts at a location may be grouped together. At each significant location, the duration of interactions, based on one or more communication modalities, may be determined. In one embodiment, the average duration of interactions, based on various communication modalities, between a user and a contact, may be determined. At a significant location, the longer (or shorter) a user interacts with a contact, the more (or less) likely the contact belongs to a group. For example, the longer a user interacts with a contact in the office, the more likely the contact should be grouped as a business connection.

In some embodiments, a time specific duration is extracted. Significant time windows (e.g., regular business hours, non-business hours, weekdays, weekends, etc.) may be identified for a user. A significant time window may be predetermined. A significant time window may be identified from a user's calendar. In a time window, contacts with whom a user interacts may be grouped together. In each significant time window, the duration of interactions, based on one or more communication modalities, may be determined. In one embodiment, the average duration of interactions, based on various communication modalities, between a user and a contact, may be determined. In a significant time window, the longer (or shorter) a user interacts with a contact, the more (or less) likely the contact belongs to a group. For example, the longer a user interacts with a contact at night, the more likely the contact should be grouped as a family member.

In some embodiments, a property specific duration is extracted. Properties such as incoming, outgoing, accepted, rejected, ignored, missed, may be determined. For a property, contacts with whom a user interacts with may be grouped together. For instance, contacts whose interactions with the user are ignored may be grouped together. For each property, the duration of interactions, based on one or more communication modalities, may be determined. In one embodiment, the average duration of interactions, based on various communication modalities, between a user and a contact, may be determined. For a property, the longer (or shorter) a user interacts with a contact, the more (or less) likely the contact belongs to a group. For example, after accepting a call, the longer a user talks to a contact, the more likely the contact should be grouped as a family member. Features may further relate to, for example, metadata (i.e., the data that provides information about one or more aspects of an interaction, such as the date of creation), pitch, tone, or volume of a user's voice, physical proximity between a contact and a user, data burst (i.e., high-bandwidth transmission over a short period of time, such as a dialogue via SMS messages), data size, application name (i.e., the name of an application, such as Pinterest®), domain name, phone number, or the number of communication modalities a user uses to interact with a contact, etc. Such features may be extracted. The features may be used to group contacts. For example, when a user shares a picture or a web link with a contact via SMS messages, it may be more likely that the contact should be grouped as a friend. When the burst rate of SMS messages between a user and a contact is low, it may be more likely that the contact should be grouped as an acquaintance. When a user interacts with a contact only on mobile site or mobile application, it may be more likely the contact should be grouped as an acquaintance.

Extracted features may be represented by one or more single-modal feature vectors. A single-modal feature vector may correspond to a communication modality and may include multiple dimensions of information that reflect multiple features. Different feature vectors may be of different dimensions. For example, the single-modal feature vector $F_{call}$ reflects features related to calls, such as frequencies, durations, types, and locations; the single-modal feature vector $F_{sms}$ reflects features related to SMS messages, such as frequencies, sizes (e.g., character count), burst frequencies, and locations; and the single-modal feature vector $F_{proximity}$ reflects features related to Bluetooth, such as frequencies, durations, and locations. For a contact, one or more single-modal feature vector may be formed.

Some features may be extracted by performing multimodal clustering such as spatial and temporal clustering. For example, a significant location or a significant time may be identified by performing spatial and temporal clustering. A significant location may be identified by clustering a user's geo-location data (e.g., GPS locations) over a period of time. Interaction data may be clustered into different groups based on geographical locations. A significant location may be identified by clustering multiple users' geo-location data (e.g., GPS locations) over a period of time. For example, a company may be identified when thousands of users' GPS locations are clustered. Interaction data may be clustered into groups by using GPS locations of one or more users gathered over a period of time.

Interaction data may also be clustered into groups based on time. In some embodiments, interaction data over a period of time may be clustered based on different times. A significant time or time periods may be predetermined (e.g., weekdays, weekends, holidays, mornings, afternoons, evenings, nights, etc.). In some embodiments, interaction data of a user over weekdays and weekends is clustered separately. A significant time or time periods may be determined by clustering a user's interaction data (e.g., calendar, calendar entries, a total number of interactions, etc.) over a period of time. Cutting time points may be identified and used to cluster interaction data. The cutting time points partition the user's interaction data into multiple clusters, and the distribution of the interaction data may be equal or almost equal among all clusters in some embodiments. In one embodiment, the distribution of interaction data based on the cutting points may be fitted into a Gaussian model.

At block 308, a user's contacts may be organized into groups based on the features extracted at block 306. Various embodiments organize a user's contacts based on multimodal attributes of social connections. Multimodal clustering based on the features generated at block 306 may be performed to partition a user's interactions with different contacts into different groups. The multimodal clustering may include feature-level fusion. The feature-level fusion constructs a global feature vector representing multimodal attributes of social connections.

A global feature vector may be created by combining single-modal feature vectors. The global feature vector may be further integrated with time and location. For example, a global feature vector $F=[F_{call}, F_{sms}, F_{proximity}]$ may be constructed from single-modal feature vectors $F_{call}, F_{sms}$, and $F_{proximity}$, corresponding to call communication modality, SMS communication modality, and physical encounter communication modality, respectively. Each single-modal feature vector may comprise different features and be of various dimensions. Because a global feature vector is constructed from single-modal feature vectors, all the features of the single-modal feature vectors are included in the global feature vector. In some embodiments, in order to avoid model overfitting, a global feature vector may be normalized by providing uniform weights to each feature included in the global feature vector. A feature corresponds to a dimension of information and may reflect a type of information about the interaction. In further embodiments, feature selection may be applied to distinguish and enhance the discriminative power of each individual feature.

Contacts may be organized into a varying number of groups based on the global feature vector, and different levels of clustering may be performed. Multimodal clustering such as optimal-K clustering may be performed to identity the number of groups into which contacts may be organized. In some embodiments, K-means clustering may be applied hierarchically to find an optimal group number thereby enhancing the organization of contacts. The optimal clustering number (i.e., the K value in K-means) for organizing a user's contacts may be automatically derived based on the features extracted at block 306. In one embodiment, the L method is applied to determine the number of clusters in clustering and segmentation.

In some embodiments, contacts may be organized based on a subset of features extracted at block 306. The subset of features may be required to meet some application requirements. For example, the subset of features may be time dependent (e.g., morning group, evening group), location dependent (e.g., home group, work group, etc.). In some embodiments, contacts may be organized based on interaction data associated with a communication modality, such as call groups, SMS groups, proximity groups, SNS or email groups.

Figure 3B:
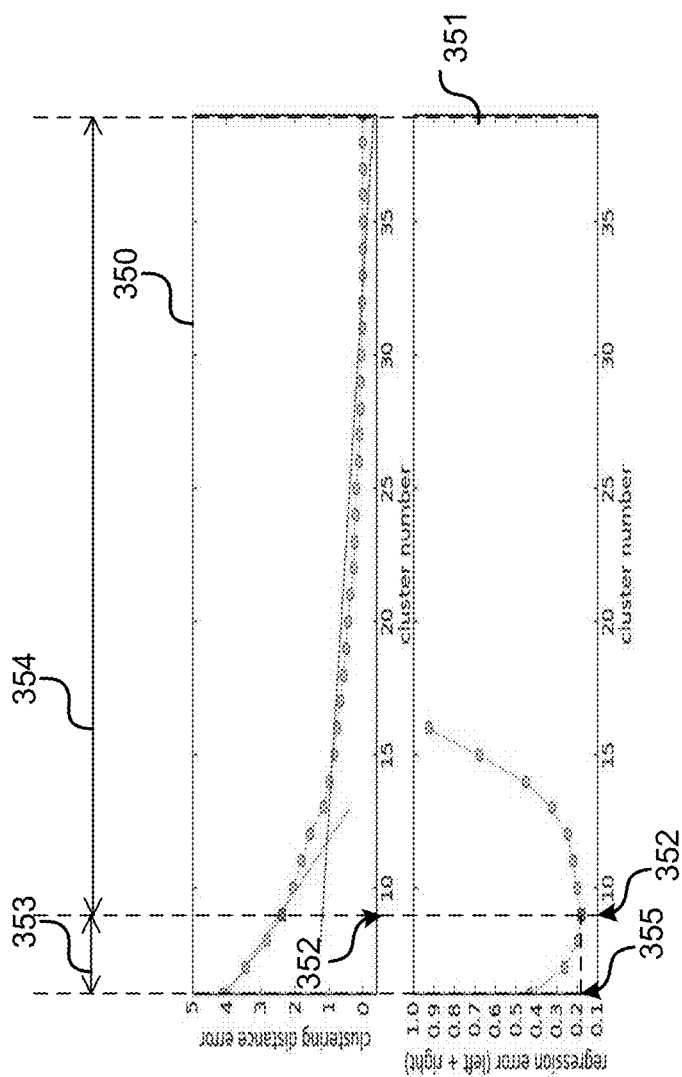
FIG. 3B illustrates using an L method to determine the number of groups into which contacts may be organized according to an embodiment of the present disclosure.

FIG. 3B illustrates using an L method to determine the number of groups into which contacts may be organized according to an embodiment of the present disclosure. Graph 350 illustrates a clustering distance error for each cluster number and graph 351 illustrates the total regression error for each cluster number.

Social grouping for each cluster number K in [$K_{min}$;$K_{max}$] may be determined. In other words, any possible number of groups into which contacts may be organized may be determined. The minimum number of groups, $K_{min}$, may equal one, indicating all contacts are organized into one group. The maximum number of groups, $K_{min}$, may equal to the number of contacts, indicating each contact is organized into one group. For each grouping result with a given K, the relevant clustering metrics (e.g., a score defined in Equation (1)) may be determined.

$$\text{score}(Cluster_k) = \sum_{k=1}^{K} \left( \sum_{\hat{x}=k_s}^{k_m} \|x_{k_i} - center_k\|_2^2 \right). \quad (1)$$

The clustering metric may be used to measure the total variance of each cluster. The more clusters, the smaller the total variance may be. As illustrated in graph 350, the total variance decreases when the cluster number increases.

Subsequently, for each K in [$K_{min}$+1;$K_{max}$−1], regression for the left-side (L1:[$K_{min}$;K]) and regression for the right side (L2:[K;$K_{max}$]) are determined, respectively. The sum of regression errors, RegressionError(L1)+RegressionError (L2), may be determined based on the left-side regression and right-side regression. For example, for the cluster number 352, regression for the left-side 353 and regression for the right side 354 may be determined, respectively. The total sum or regression errors 355 for the cluster number 352 may be determined by adding the regressions for the left-side 353 and for the right-side 354. The optimal K is selected according to the sum of regression errors, such that the minimum regression error is provided. In the illustrated example, the optimal K is selected to be the cluster number 352 because the cluster number 352 has the minimum total regression error 355 among all the cluster numbers.

In various embodiments, organization of contacts determined on a device may be synchronized among all the devices a user uses to interact with the user's contacts. Social grouping is consistent among all of a user's devices. For example, a user may use a cellphone to interact with contacts during the day and a tablet to interact with contacts at night. The user's contacts may be organized based on records from the cellphone and the tablet. The user's contacts may be organized on the cellphone, the tablet, or both. Once contacts are organized on the cellphone, the organization is synchronized from the cellphone to the tablet, or vice versa. As such, contacts are organized consistently between the cellphone and the tablet.

At block 310, each group that is formed at block 308, may be characterized. In various embodiments, a group may be characterized based on the group size or group significance ranking in terms of closeness between a contact and a user. Characteristics associated with a group of a user's contacts may be determined from a ground truth of the user's social groups. The ground truth of a user's social group may be collected by detecting the labels defined by the user. A user may label his or her contacts into various categories such as: Friend, Colleague, Acquaintance, Family/Relative, Spouse/Partner, Business, and other. The group formed at block 308 may be compared with the ground truth by grouping metrics (e.g., clustering metric such as purity). In further embodiments, information relating to the group size, representative features, distinct time or location patterns of group communications, and closeness ranking of contacts may be determined and used to characterize a group. In some embodiments, semi-supervised user-specific rules may be defined and used to characterize groups. User-specific rules may include, for example, a rule that evening calls are with close friends, a rule that calls from an area code are with family members, a rule that a large size of SMS messages are with close friends or family members, etc.

Organization of contacts and/or characterization of groups may be performed periodically or adaptively to reflect changes in groups of contacts. Due to changes in the activity and communication patterns of individuals, groups of contacts may change. In some embodiments, organizing contacts may be performed periodically (e.g., every week, every month, every quarter). The contact organization period may be defined by a user or subject to a system default.

Contacts may be organized dynamically and adaptively. In some embodiments, contacts may be organized in response to a triggering event. For example, a change may be detected in a user's communication behavior (e.g., a significant increase in calls or SMS messages in a period), a user's contacts (e.g., a contact book, an email contact list, etc.) are significantly updated, or a change is detected in user's home or work location.

In some embodiments, contacts may be organized to reflect group dynamics and group evolutions. The group dynamics may be captured and the group evolution may be monitored. Groups may be subject to changes. Group evolution may include, for example, a formation of a new group, a change in group size, a change in group characterization, or a termination of a group. Group dynamics may be detected by analyzing the records (e.g., Bluetooth logs, call logs, email histories, etc.) obtained from one or more record sources. As such, group evolution may be captured and thereby provide a basis for making decisions (e.g., a user's privacy settings, business decisions, etc.) For example, a group member Bob leaves team A and joins team B, and as a result, both the groups team A and team B have changed. Such changes may be detected by analyzing Bob's communication records such as call logs or Bluetooth logs. For example, Bob may interact more frequently with members of the group team B and less frequently with members of the group team A. These group dynamics may be captured and the group evolution is monitored. In addition, relevant group settings (e.g., sharing policies) for the groups team A and team B may take effect immediately. For instance, the ex-member Bob may be excluded from sharing documents or services in the group team A but included in sharing documents or services in the group team B.

Whether the organization of contacts needs to be updated may be determined according to the group evolution. If there is a significant change in the user's contact group evolution, the current organization of the user's contacts needs to be updated. In one embodiment, a user's contacts may be organized less frequently upon determining that there is no or little significant change in a user's contact group evolution. The user's contacts may be organized more frequently upon determining that there is a significant change in a user's contact group evolution. In some embodiments, group evolutions may be application specific and a user's contacts may be organized differently for different applications. For example, for a user, a group that is for business applications and including the user's colleagues is relatively stable compared to a group that is for social applications and including the user's social connections. Social groups such as hiking and skiing are subject to weather and may have their own seasonal cycles. These groups may evolve quickly and adaptively based on seasons and real-time weather conditions. Accordingly, the user's contacts may be organized less frequently for the group for business applications than for the group for social applications. In general, the user's contacts may be periodically or intermittently organized at suitable times or frequencies based on the unique attributes of the group.

Figure 4:
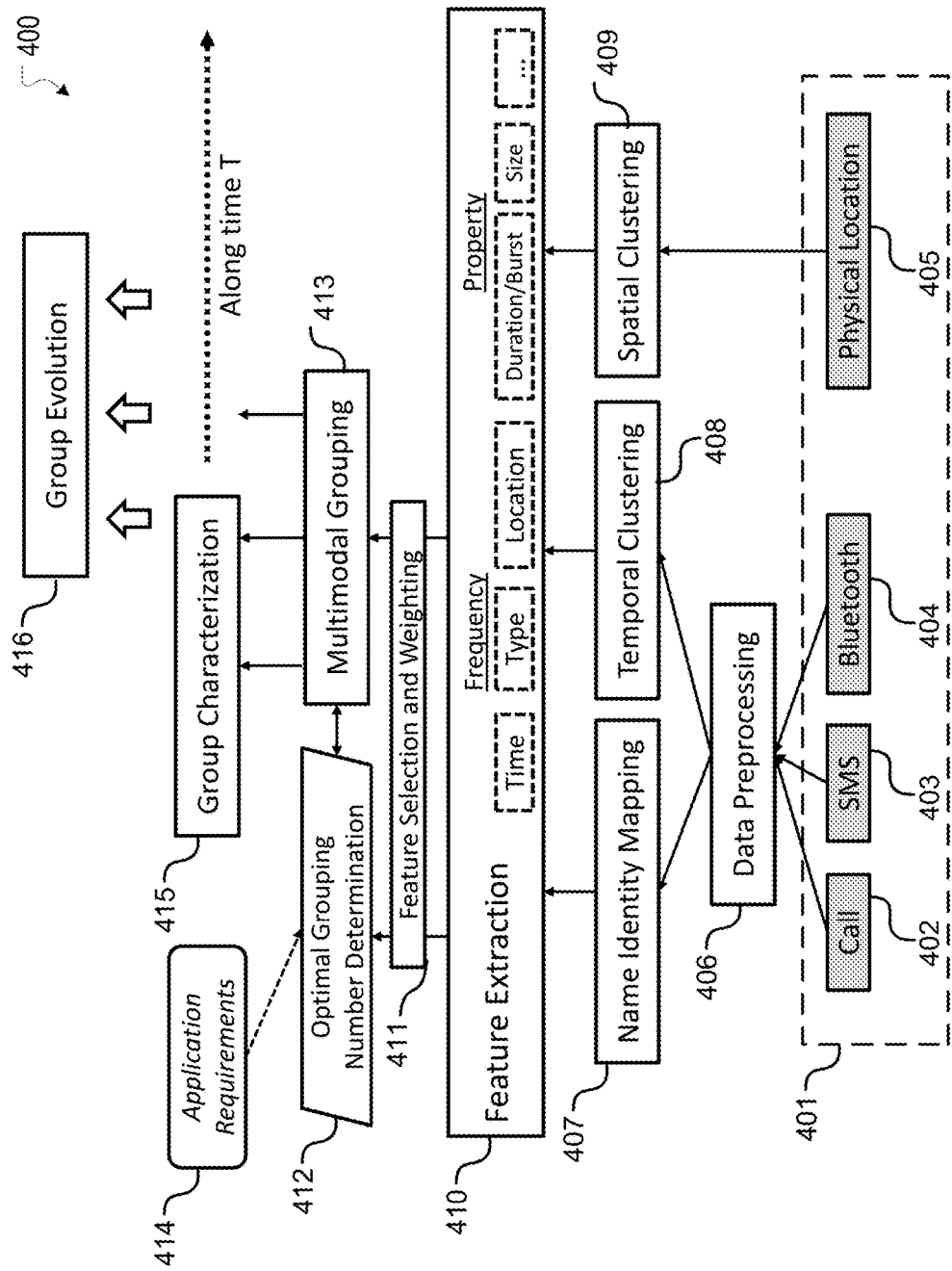
FIG. 4 illustrates an example diagram of a system for organizing contacts in a user-centric manner according to an embodiment of the present disclosure.

FIG. 4 illustrates an example diagram of a system 400 for organizing contacts in a user-centric manner according to an embodiment of the present disclosure. A call log 402, an SMS log 403, a Bluetooth log 404 as well as a location log 405 are collected, all of which may be collectively referred to as records 401. Records 401 may further include a Wi-Fi connection log, an NFC log, an application (e.g., emails, social networks, games, web browser, etc.) log, etc. Records may be obtained from one or more devices belonging to the user or from an Application Programming Interface ("API"). The API or other communication interfaces for provision of the records may be included in or associated with a computer system or data store that is managed, supported, or utilized by the user or by an entity other than the user. Such a computer system or data store may be local or remote and, in relation to a device of the user, may function as a server (e.g., in a private or public cloud) or peer. Records obtained from different record sources may be processed and analyzed together to organize the contacts of the user. Interaction data associated with a user's contacts may be determined from the records 401, such as by a data processing module 406. Name identity mapping 407 may be performed. One or more records 401 may be processed such that a user's interactions with a contact via different communication modalities may be mapped to the same contact. The call log 402, the SMS log 403, and the Bluetooth log 404 may be processed such that interactions between a contact and a user is associated with the contact across various records 401.

Features may be extracted from the interaction data and/or various records 401. Temporal clustering 408 and spatial clustering 409 may be performed to extract features such as a frequency, a duration, a property, and/or a proximity of an interaction, a significant location, and/or a significant time of a user. One or more single-modal feature vectors may be formed. A global feature vector may be created by combining single-modal feature vectors. The global feature vector may be integrated with time and location, representing the multimodal attributes of social connections.

The feature vector 410 includes various features such as a frequency (e.g., a time, a type, a location) of an interaction based on a communication modality, or a duration, a burst, or a size of the interaction based on the communication modality. Feature selection and weighting 411 may be performed to normalize a global feature vector and/or distinguish and enhance the discriminative power of each individual feature. Uniform weights applied to each feature of a global feature vector may avoid model overfitting.

Multimodal grouping 413 entails that contacts may be organized into a varying number of groups based on the global feature vector by performing different levels of clustering. The optimal grouping number 412 may be determined. For example, K-means clustering may be applied to determine the optimal group number, which may be subject to veracious application requirements 414. The application requirements 414 may include a specific number of groups for a particular communication modality. For example, a user's contacts need to be organized into five groups under the call communication modality. Each group may be characterized 415, and group evolution 416 may be observed over time.

FIG. 5A is a table 500 illustrating example features of various communication modalities according to an embodiment of the present disclosure. The table 500 comprises features corresponding to communication modalities, which may include phone calls 501, SMS 502, and Bluetooth 503, for a user. Features may include a time specific frequency 510, a type specific frequency 511, a location specific frequency 512, and an average duration 513 of each communication modality. The time specific frequency 510 may include sub-features weekday 514 and weekend 515. The weekday specific frequency 514 may include features morning 516, afternoon 517, evening 518, and night 519. The weekend specific frequency 515 may further include features morning 520, afternoon 521, evening 522, and night 523. The type specific frequency 511 may include features incoming and missed 524, and outgoing 525. The location specific frequency 512 may include features home 526, work 527, and elsewhere 528.

The features 510-513 may be extracted from a user's interaction data for communication modalities 501-503. Some features may not be applicable to some communication modalities. For example, the feature incoming and missed 524 and outgoing 525 are not applicable to the communication modality Bluetooth 503, and the feature average duration 513 is not applicable to the communication modality SMS 502.

Figure 5B:
FIG. 5B is a table illustrating example features of various communication modalities according to an embodiment of the present disclosure.

FIG. 5B is a table 530 illustrating example features of various communication modalities according to an embodiment of the present disclosure. The table 530 comprises features corresponding to communication modalities, which may include phone calls 501, SMS 502, Bluetooth 503, and Social Network Service (SNS) 531 for a user. Features may include a time specific frequency 510, a type specific frequency 511, a location specific frequency 512, a duration 513, and burst length 532 of each communication modality. The time specific frequency 510 may include sub-features weekday 514 and weekend 515. The weekday specific frequency 514 may include features morning 516, afternoon 517, evening 518, and night 519. The weekend specific frequency 515 may further include features morning 520, afternoon 521, evening 522, and night 523. The type specific frequency 511 may include features incoming and missed 524, and outgoing 525. The location specific frequency 512 may include features home 526, work 527, and elsewhere 528.

The features 510-513 and 532 may be extracted from a user's interaction data for communication modalities 501-503 and 531. Some features may not be applicable to some communication modalities. For example, the feature burst length are not applicable to the communication modalities call 501 and Bluetooth 503. Moreover, the interaction data for communication modalities 501-503 and 531 may be generated based on records obtained from multiple record sources. For example, the interaction data for the communication modalities 501-503 may be generated based on the records obtained from the user's cell phone, whereas the interaction data for the communication modality 531 may be generated based on the records obtained from the user's SNS account. The interaction data generated based on the records obtained from different record sources may be processed together.

Figure 5C:
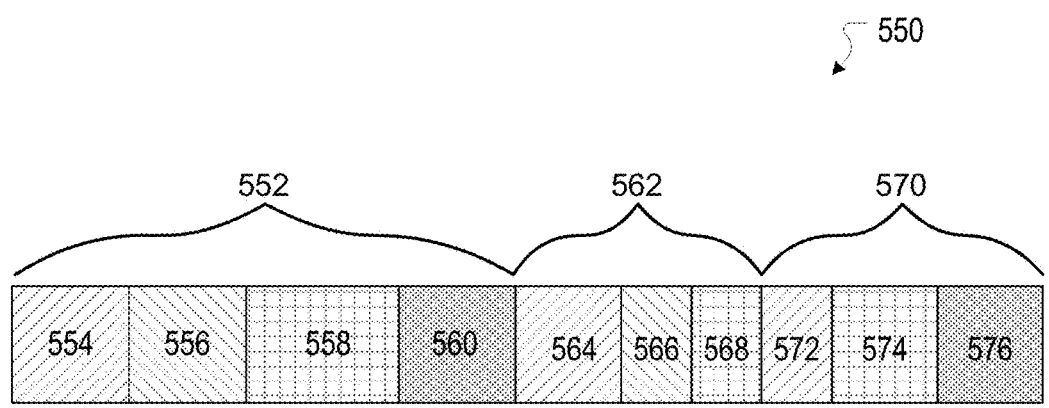
FIG. 5C illustrates an example global feature vector according to an embodiment of the present disclosure.

FIG. 5C illustrates an example global feature vector 550 in accordance with an embodiment of the present disclosure. The global feature vector 550 comprises a sub-feature vector 552, a sub-feature vector 562, and a sub-feature vector 570. The sub-feature vector 552, the sub-feature vector 562, and the sub-feature vector 570 correspond to single-modal feature vectors for the communication modality call $F_{call}$ 501 with 14 dimensions, for the communication modality SMS $F_{SMS}$ 502 with 13 dimensions, and for the communication modality $F_{Bluetooth}$ Bluetooth 503 with 12 dimensions, illustrated in FIG. 5A, respectively.

The sub-feature vector 552 reflects features 554, 556, 558, and 560, which correspond to time specific frequency 510, type specific frequency 511, location specific frequency 512, and average duration 513, illustrated in FIG. 5A, respectively. The sub-feature vector 562 reflects features 564, 566, 568, which correspond to time specific frequency 510, type specific frequency 511, and location specific frequency 512, respectively. The sub-feature vector 570 reflects features 572, 574, 576, which correspond to time specific frequency 510, location specific frequency 512, and average duration 513, respectively.

It is further contemplated that there can be many other possible uses, applications, and/or variations associated with the various embodiments of the present disclosure.

Hardware Implementation

Figure 6:
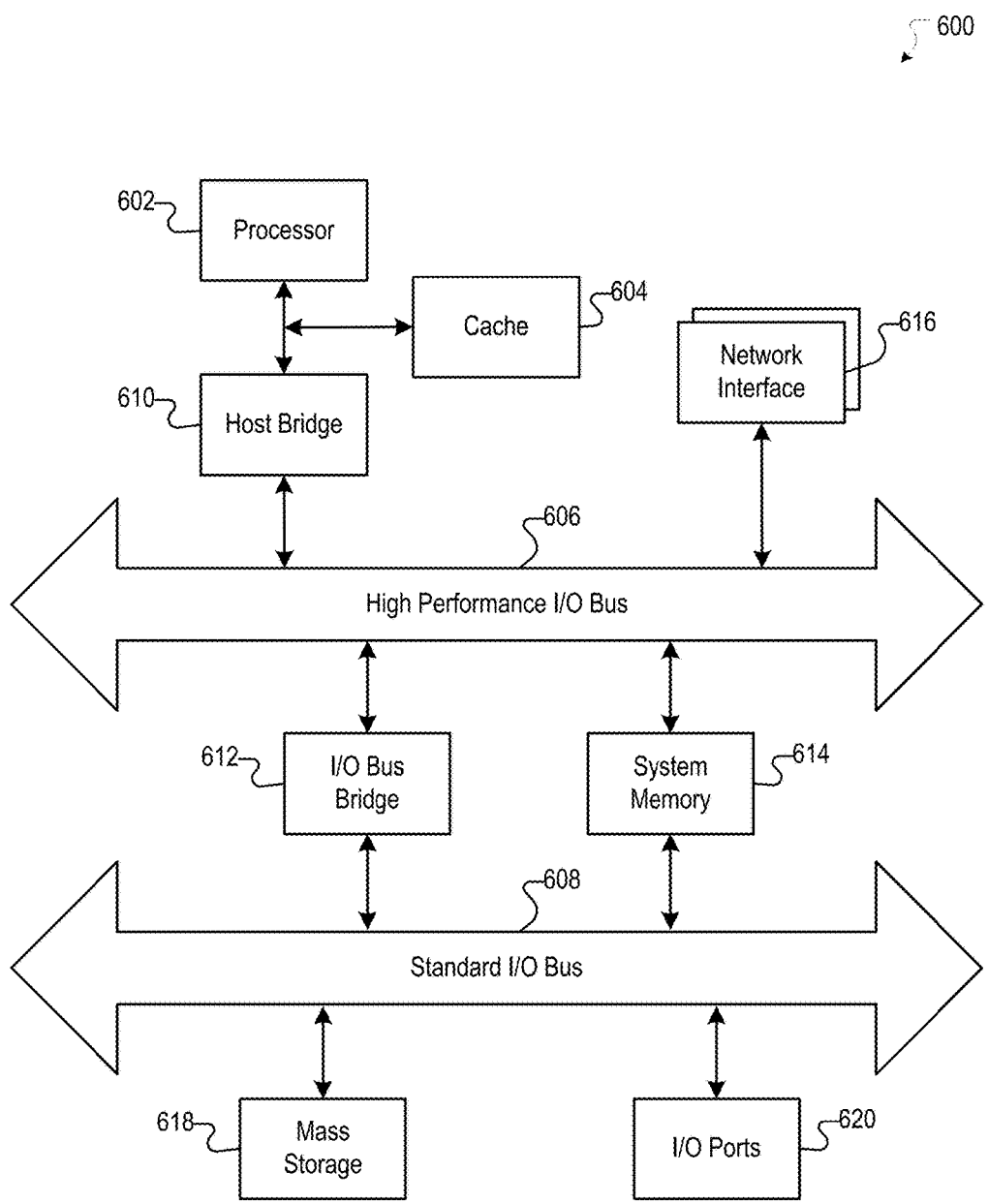
FIG. 6 illustrates an example of a computing device or system that can be used to implement one or more of the embodiments described herein according to an embodiment of the present disclosure.

The foregoing processes and features can be implemented by a wide variety of machine and computer system architectures and in a wide variety of network and computing environments. FIG. 6 illustrates an example of a computer system 600 that may be used to implement one or more of the embodiments described herein in accordance with an embodiment of the invention. The computer system 600 includes sets of instructions for causing the computer system 600 to perform the processes and features discussed herein. The computer system 600 may be connected (e.g., networked) to other machines. In a networked deployment, the computer system 600 may operate in the capacity of a server machine or a client machine in a client-server network environment, or as a peer machine in a peer-to-peer (or distributed) network environment. In an embodiment of the invention, the computer system 600 may be a component of the networking system described herein. In an embodiment of the present disclosure, the computer system 600 may be one server among many that constitutes all or part of a networking system.

The computer system 600 can include a processor 602, a cache 604, and one or more executable modules and drivers, stored on a computer-readable medium, directed to the processes and features described herein. Additionally, the computer system 600 may include a high performance input/output (I/O) bus 606 or a standard I/O bus 608. A host bridge 610 couples processor 602 to high performance I/O bus 606, whereas I/O bus bridge 612 couples the two buses 606 and 608 to each other. A system memory 614 and one or more network interfaces 616 couple to high performance I/O bus 606. The computer system 600 may further include video memory and a display device coupled to the video memory (not shown). Mass storage 618 and I/O ports 620 couple to the standard I/O bus 608. The computer system 600 may optionally include a keyboard and pointing device, a display device, or other input/output devices (not shown) coupled to the standard I/O bus 608. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 600, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 600 are described in greater detail below. In particular, the network interface 616 provides communication between the computer system 600 and any of a wide range of networks, such as an Ethernet (e.g., IEEE 802.3) network, a backplane, etc. The mass storage 618 provides permanent storage for the data and programming instructions to perform the above-described processes and features implemented by the respective computing systems identified above, whereas the system memory 614 (e.g., DRAM) provides temporary storage for the data and programming instructions when executed by the processor 602. The I/O ports 620 may be one or more serial and/or parallel communication ports that provide communication between additional peripheral devices, which may be coupled to the computer system 600.

The computer system 600 may include a variety of system architectures, and various components of the computer system 600 may be rearranged. For example, the cache 604 may be on-chip with processor 602. Alternatively, the cache 604 and the processor 602 may be packed together as a "processor module", with processor 602 being referred to as the "processor core". Furthermore, certain embodiments of the invention may neither require nor include all of the above components. For example, peripheral devices coupled to the standard I/O bus 608 may couple to the high performance I/O bus 606. In addition, in some embodiments, only a single bus may exist, with the components of the computer system 600 being coupled to the single bus. Furthermore, the computer system 600 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 600 that, when read and executed by one or more processors, cause the computer system 600 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 600, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 602. Initially, the series of instructions may be stored on a storage device, such as the mass storage 618. However, the series of instructions can be stored on any suitable computer readable storage medium. Furthermore, the series of instructions need not be stored locally, and could be received from a remote storage device, such as a server on a network, via the network interface 616.

The instructions are copied from the storage device, such as the mass storage 618, into the system memory 614 and then accessed and executed by the processor 602. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 600 to perform any one or more of the processes and features described herein.

Figure 7:
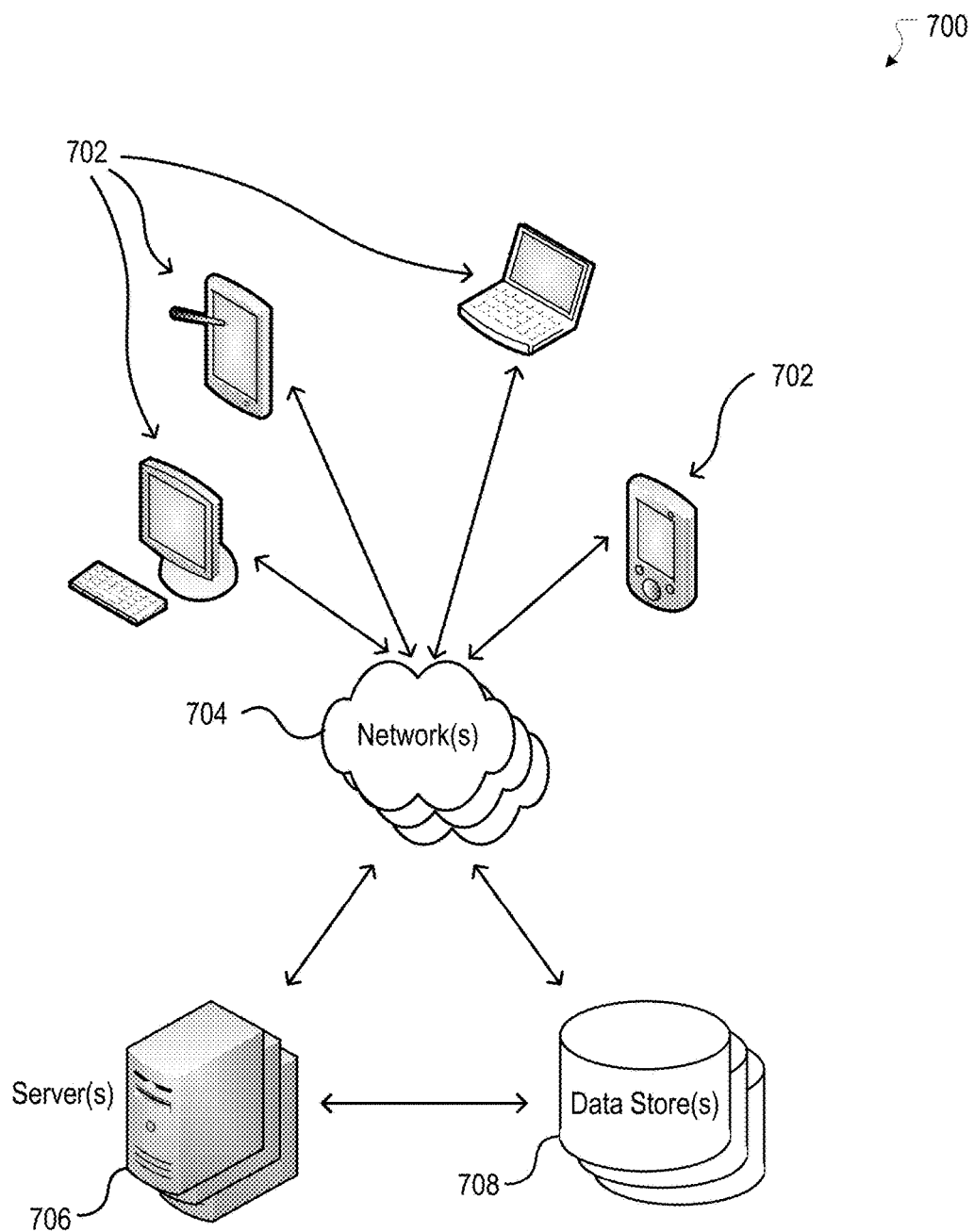
FIG. 7 illustrates a network environment in which various embodiments can be implemented according to an embodiment of the present disclosure.

As discussed, different approaches can be implemented in various environments in accordance with the described embodiments. For example, FIG. 7 illustrates an example network system embodiment (or network environment) 700 for implementing aspects in accordance with various embodiments. The example network system 700 can include one or more computing devices, computing systems, electronic devices, client devices, etc. (e.g., 702). In some instances, each of these devices and/or systems 702 can correspond to the computer system 600 in FIG. 6. The example network system 700 can also include one or more networks 704. Further, there can be one or more servers 706 and one or more data stores 708 in the network system 700.

As shown in FIG. 7, the one or more example computing devices (i.e., computing systems, electronic devices, client devices, etc.) 702 can be configured to transmit and receive information to and from various components via the one or more networks 704. For example, multiple computing devices 702 can communicate with one another via a Bluetooth network (e.g., 704). In another example, multiple computing devices 702 can communicate with one another via the Internet (e.g., 704). In a further example, multiple computing devices 702 can communicate with one another via a local area network (e.g., 704).

In some embodiments, examples of computing devices 702 can include (but are not limited to) personal computers, desktop computers, laptop/notebook computers, tablet computers, electronic book readers, mobile phones, cellular phones, smart phones, handheld messaging devices, personal data assistants (PDAs), set top boxes, cable boxes, video gaming systems, smart televisions, smart appliances, smart cameras, wearable devices, etc. In some cases, a computing device 702 can include any device and/or system having a processor. In some case, a computing device 702 can include any device and/or system configured to communicate via the one or more networks 704.

Moreover, regarding the computing devices 702, various hardware elements associated with the computing devices 702 can be electrically coupled via a bus. As discussed above, elements of computing devices 702 can include, for example, at least one processor (e.g., central processing unit (CPU)), at least one input device (e.g., a mouse, keyboard, button, microphone, touch sensor, controller, etc.), and at least one output device (e.g., a display screen, speaker, ear/head phone port, tactile/vibration element, printer, etc.). The computing device 702 can also include one or more storage devices. For example, the computing device 702 can include optical storage devices, disk drives, and solid-state storage devices (e.g., random access memory ("RAM"), read-only memory ("ROM"), etc.). In another example, the computing device 702 can include portable or removable media devices, flash cards, memory cards, etc.

Further, the computing device(s) 702 can include a computer-readable storage media reader, a communications device (e.g., a modem, a network card (wireless or wired), an infrared communication device, etc.). The computer-readable storage media reader can be capable of connecting with or receiving a computer-readable storage medium. The computer-readable storage medium can, in some cases, represent various storage devices and storage media for temporarily and/or more permanently storing, interacting with, and accessing data. The communications device can facilitate in transmitting and/or receiving data via the network(s) 704.

In some embodiments, the computing device 702 can utilize software modules, services, and/or other elements residing on at least one memory device of the computing device 702. In some embodiments, the computing device 702 can utilize an operating system (OS) and/or a program. For example, the computing device 702 can utilize a web browsing application to interact with and/or access various data (e.g., content) via the network(s) 704. It should be understood that numerous variations and applications are possible for the various embodiments disclosed herein.

In some embodiments, examples of the one or more networks 704 can include (but are not limited to) an intranet, a local area network (LAN, WLAN, etc.), a cellular network, the Internet, and/or any combination thereof. Components used for implementing the network system 700 can depend at least in part upon a type(s) of network(s) and/or environment(s). A person of ordinary skill in the art would recognize various protocols, mechanisms, and relevant parts for communicating via the one or more networks 704. In some instances, communication over the network(s) 704 can be achieved via wired connections, wireless connections (WiFi, WiMax, Bluetooth, radio-frequency communications, near field communications, etc.), and/or combinations thereof.

In some embodiments, the one or more networks 704 can include the Internet, and the one or more servers 706 can include one or more web servers. The one or more web servers can be configured to receive requests and provide responses, such as by providing data and/or content based on the requests. In some cases, the web server(s) can utilize various server or mid-tier applications, including HTTP servers, CGI servers, FTP servers, Java servers, data servers, and business application servers. The web server(s) can also be configured to execute programs or scripts in reply to requests from the computing devices 702. For example, the web server(s) can execute at least one web application implemented as at least one script or program. Applications can be written in various suitable programming languages, such as Java®, JavaScript, C, C# or C++, Python, Perl, TCL, etc., and/or combinations thereof.

In some embodiments, the one or more networks 704 can include a local area network, and the one or more servers 706 can include a server(s) within the local area network. In one example, a computing device 702 within the network(s) 704 can function as a server. Various other embodiments and/or applications can also be implemented.

In some embodiments, the one or more servers 706 in the example network system 700 can include one or more application servers. Furthermore, the one or more applications servers can also be associated with various layers or other elements, components, processes, which can be compatible or operable with one another.

In some embodiments, the network system 700 can also include one or more data stores 708. The one or more servers (or components within) 706 can be configured to perform tasks such as acquiring, reading, interacting with, modifying, or otherwise accessing data from the one or more data stores 708. In some cases, the one or more data stores 708 can correspond to any device/system or combination of devices/systems configured for storing, containing, holding, accessing, and/or retrieving data. Examples of the one or more data stores 708 can include (but are not limited to) any combination and number of data servers, databases, memories, data storage devices, and data storage media, in a standard, clustered, and/or distributed environment.

The one or more application servers can also utilize various types of software, hardware, and/or combinations thereof, configured to integrate or communicate with the one or more data stores 708. In some cases, the one or more application servers can be configured to execute one or more applications (or features thereof) for one or more computing devices 702. In one example, the one or more applications servers can handle the processing or accessing of data and business logic for an application(s). Access control services in cooperation with the data store(s) 708 can be provided by the one or more application servers. The one or more application servers can also be configured to generate content such as text, media, graphics, audio and/or video, which can be transmitted or provided to a user (e.g., via a computing device 702 of the user). The content can be provided to the user by the one or more servers 706 in the form of HyperText Markup Language (HTML), Extensible HyperText Markup Language (XHTML), Extensible Markup Language (XML), or various other formats and/or languages. In some cases, the application server can work in conjunction with the web server. Requests, responses, and/or content delivery to and from computing devices 702 and the application server(s) can be handled by the web server(s). It is important to note that the one or more web and/or application servers (e.g., 706) are included in FIG. 7 for illustrative purposes.

In some embodiments, the one or more data stores 708 can include, for example, data tables, memories, databases, or other data storage mechanisms and media for storing data. For example, the data store(s) 708 can include components configured to store application data, web data, user information, session information, etc. Various other data, such as page image information and access rights information, can also be stored in the one or more data stores 708. The one or more data stores 708 can be operable to receive instructions from the one or more servers 706. The data stores 708 can acquire, update, process, or otherwise handle data in response to instructions.

In some instances, the data store(s) 708 can reside at various network locations. For example, the one or more data stores 708 can reside on a storage medium that is local to and/or resident in one or more of the computing devices 702. The data store(s) 708 can also reside on a storage medium that is remote from the devices of the network(s) 704. Furthermore, in some embodiments, information can be stored in a storage-area network ("SAN"). In addition, data useful for the computing devices 702, servers 706, and/or other network components can be stored locally and/or remotely.

In one example, a user of a computing device 702 can perform a search request using the computing device 702. In this example, information can be retrieved and provided to the user (via the computing device 702) in response to the search request. The information can, for example, be provided in the form of search result listings on a web page that is rendered by a browsing application running on the computing device 702. In some cases, the one or more data stores 708 can also access information associated with the user (e.g., the identity of the user, search history of the user, etc.) and can obtain search results based on the information associated with the user.

Moreover, in some embodiments, the one or more servers 706 can each run an operating system (OS). The OS running on a respective server 706 can provide executable instructions that facilitate the function and performance of the server. Various functions, tasks, and features of the one or more servers 706 are possible and thus will not be discussed herein in detail. Similarly, various implementations for the OS running on each server are possible and therefore will not be discussed herein in detail.

In some embodiments, various aspects of the present disclosure can also be implemented as one or more services, or at least a portion thereof. Services can communicate using many types of messaging, such as HTML, XHTML, XML, Simple Object Access Protocol (SOAP), etc. Further, various embodiments can utilize network communicational protocols, such as TCP/IP, OSI, FTP, UPnP, NFS, CIFS, etc. Examples of the one or more networks 704 can further include wide-area networks, virtual private networks, extranets, public switched telephone networks, infrared networks, and/or any combinations thereof.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

It should also be appreciated that the specification and drawings are to be regarded in an illustrative sense. It can be evident that various changes, alterations, and modifications can be made thereunto without departing from the broader spirit and scope of the disclosed technology.

Moreover, the language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed:

1. A method, comprising:
obtaining records related to interactions between a user and a set of contacts;
processing the records to generate interaction data of the user with the set of contacts;
determining, by a first device, communication patterns that describe interactions between the user and the set of contacts, the communication patterns being recorded by at least the first device;
determining, by the first device, one or more sets of respective features from the communication patterns, the one or more sets of respective features capturing at least spatial relationships and temporal relationships in the interactions;
applying, by the first device, a multi-modal clustering to the one or more sets of respective features based upon the spatial and temporal relationships in the interactions between the user and the set of contacts, wherein each contact of the set of contacts is a multi-modal contact associated with different communication modalities;
for each multi-modal contact, generating a unique contact ID representing the different communication modalities of the multi-modal contact;
organizing, by the first device, the set of contacts into a set of groups based at least in part on the multi-modal clustering and the unique contact ID;
detecting a triggering event based upon a change of the user's location and event data specific to an application, wherein the user's location may be identified as a significant location based upon the multi-modal clustering; and
updating the set of groups based on the triggering event and the multi-modal clustering.

2. The method of claim 1, wherein:
the triggering event is associated with at least one communication pattern.

3. The method of claim 1, further comprising constructing a feature vector for a contact of the set of contacts, the feature vector representing the communication patterns associated with the interactions between the user and the contact.

4. The method of claim 1, further comprising determining a group characteristic for each group of the set of groups.

5. The method of claim 1, further comprising:
detecting group dynamics for the set of groups; and
organizing the set of contacts based on the group dynamics.

6. The method of claim 1, wherein the communication patterns are associated with interactions recorded on a second device between the user and the set of contacts.

7. A system comprising:
at least one processor; and
a memory storing instructions that, when executed by the at least one processor, cause the system to perform:
obtaining records related to interactions between a user and a set of contacts;
processing the records to generate interaction data of the user with the set of contacts;
determining, by a first device, communication patterns that describe interactions between the user and the set of contacts, the communication patterns being recorded by at least the first device;
determining, by the first device, one or more sets of respective features from the communication patterns, the one or more sets of respective features capturing at least spatial relationships and temporal relationships in the interactions;
applying, by the first device, a multi-modal clustering to the one or more sets of respective features based upon the spatial relationships and the temporal relationships in the interactions between the user and the set of contacts, wherein each contact of the set of contacts is a multi-modal contact associated with different communication modalities;
for each multi-modal contact, generating a unique contact ID representing the different communication modalities of the multi-modal contact;
organizing, by the first device, the set of contacts into a set of groups based at least in part on the multi-modal clustering and the unique contact ID;
detecting a triggering event based upon a change of the user's location and event data specific to an application, wherein the user's location may be identified as a significant location based upon the multi-modal clustering; and
updating the set of groups based on the triggering event and the multi-modal clustering.

8. The system of claim 7, wherein:
the triggering event is associated with at least one communication pattern.

9. The system of claim 7, wherein the instructions, when executed by the at least one processor, cause the system to further perform constructing a feature vector for a contact of the set of contacts, the feature vector representing the communication patterns associated with the interactions between the user and the contact.

10. A non-transitory computer-readable storage medium including instructions that, when executed by at least one processor of a computing system, cause the computing system to perform:
obtaining records related to interactions between a user and a set of contacts;
processing the records to generate interaction data of the user with the set of contacts;
determining, by a first device, communication patterns that describe interactions between the user and the set of contacts, the communication patterns being recorded by at least the first device;
determining, by the first device, one or more sets of respective features from the communication patterns, the one or more sets of respective features capturing at least spatial relationships and the temporal relationships in the interactions;
applying, by the first device, a multi-modal clustering to the one or more sets of respective features based upon the spatial relationships and the temporal relationships in the interactions between the user and the set of contacts;
wherein each contact of the set of contacts is a multi-modal contact associated with different communication modalities;
for each multi-modal contact, generating a unique contact ID representing the different communication modalities of the multi-modal contact;

organizing, by the first device, the set of contacts into a set of groups based at least in part on the multi-modal attributes and the unique contact ID;

detecting a triggering event based upon a change of the user's location and event data specific to an application, wherein the user's location may be identified as a significant location based upon the multi-modal clustering; and updating the set of groups based on the triggering event and the multi-modal clustering.

11. The non-transitory computer-readable storage medium of claim 10, wherein the triggering event is associated with at least one communication pattern.

\* \* \* \* \*